(12) United States Patent
Huang (10) Patent No.: US 8,554,139 B2
(45) Date of Patent: Oct. 8, 2013

(54) TRANSMISSION METHOD AND RELATED APPARATUS FOR REDUCING RADIO RESOURCE OVERHEAD

(75) Inventor: Jia-Bin Huang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 1015 days.

(21) Appl. No.: 12/607,067

(22) Filed: Oct. 28, 2009

(65) Prior Publication Data

US 2011/0097997 A1 Apr. 28, 2011

(51) Int. Cl.
*H04B 7/00* (2006.01)
(52) U.S. Cl.
USPC .......................................... 455/41.2

(58) Field of Classification Search
USPC ............... 455/41.2, 41.3, 509, 450; 370/458, 370/337, 347
See application file for complete search history.

(56) References Cited

U.S. PATENT DOCUMENTS

| 5,930,246 A * | 7/1999 | Akutsu ......................... 370/337 |
| 2009/0154446 A1 * | 6/2009 | Adler et al. ................... 370/350 |

* cited by examiner

*Primary Examiner* — Eugene Yun
(74) *Attorney, Agent, or Firm* — Winston Hsu; Scott Margo (57) ABSTRACT

The present invention provides a transmission method for reducing radio resource overhead for a slave device of the Bluetooth system. The transmission method includes the steps of setting an active time slot window on a communication time comprising at least a reception time slot and transforming the reception time slots in the active time slot window into transmission time slots.

18 Claims, 12 Drawing Sheets

TRANSMISSION METHOD AND RELATED APPARATUS FOR REDUCING RADIO RESOURCE OVERHEAD

BACKGROUND OF THE INVENTION

1. Field of the Invention

The present invention relates to a transmission method and related apparatus for a Bluetooth system, and more particularly to, a transmission method and related apparatus of allowing a slave device to actively send packets in a Bluetooth system.

2. Description of the Prior Art

A Bluetooth system is a wireless communication system, which uses piconet as a minimum network unit. The Bluetooth system allows one master device to communicate with up to seven slave devices, using time division duplexing technology. The Bluetooth system divides communication time on a physical channel into several time slots. The time slots are numbered by a clock of the master device. The even-numbered time slots are considered "Master-to-Slave" time slots. The odd-numbered time slots are considered "Slave-to-Master" time slots. On transmission timing, the master device and the slave device alternately transmit packets. The master device is allowed to transmit packets to the slave device only in the even-numbered time slots. The slave devices start Bluetooth time division duplexing to respond the packet transmission of the master device.

Nowadays, many slave devices are applied to human interface devices (HIDs), such as a keyboard, a mouse, a headset and a controller. The main function of those slave devices aims at reception of movements from the user, such as typing on a keyboard, moving a mouse, or swinging a controller. Since those movements are somewhat unpredictable, with multiple HID devices, the master device has to employ a polling operation to, one by one, check if each HID device detects any movement from the user.

Figure 1:
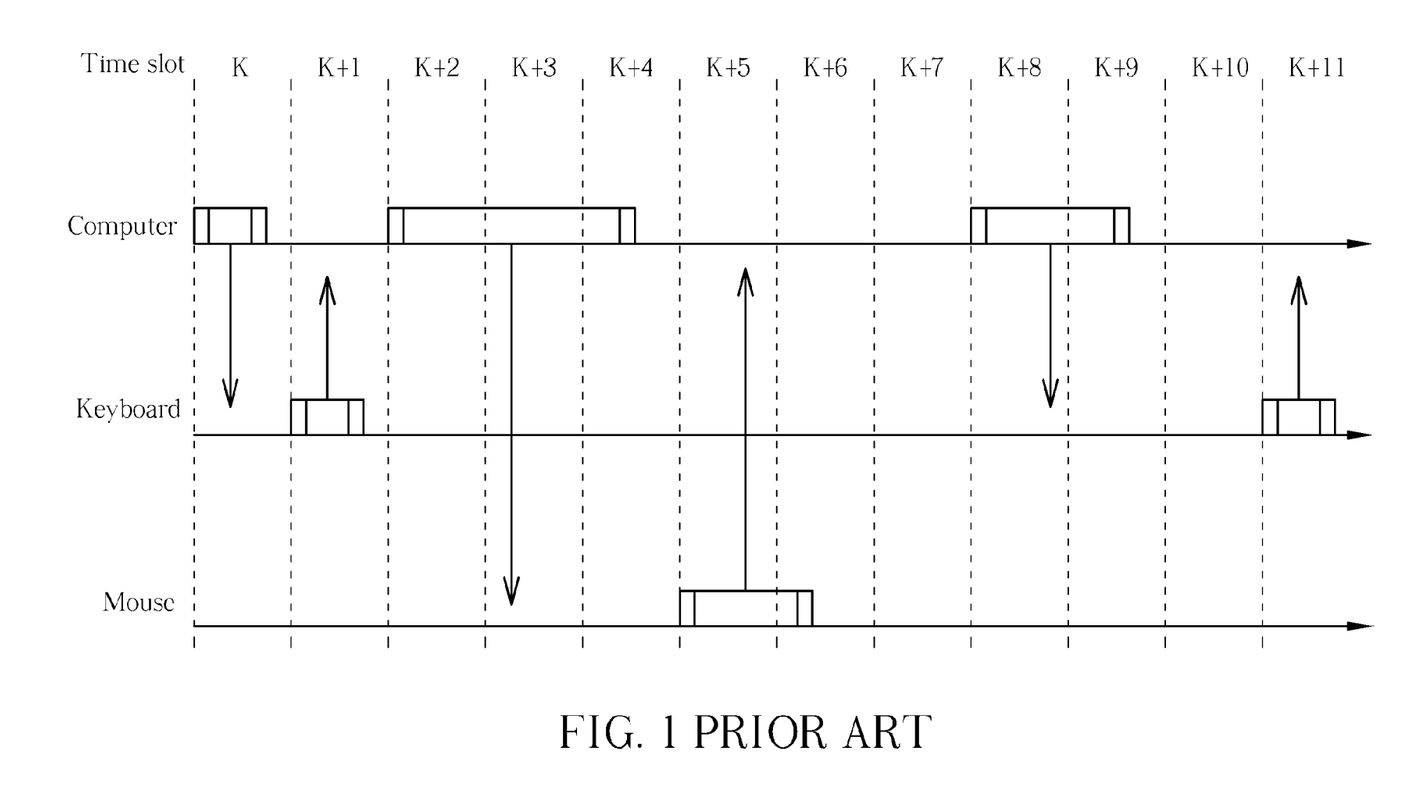
FIG. 1 is a timing diagram of a polling operation in a Bluetooth system according to the prior art.

Please refer to FIG. 1, which is a timing diagram of a polling operation in a Bluetooth system according to the prior art. FIG. 1 illustrates the polling between a computer (master device) and a keyboard and a mouse (two slave devices) in a piconet. On communication time, time slots K, (K+2), (K+4) . . . (K+10) are denoted as "Mast-to-Slave" time slots. Likewise, time slots (K+1), (K+3) . . . (K+11) are denoted as "Slave-to-Master" time slots. In FIG. 1, the computer polls the keyboard and the mouse by turns. First, the computer sends a polling packet PPK1 to the keyboard in the time slot K and receives a response packet from the keyboard in the time slot (K+1). Then the computer sends a polling packet PPK2 to the mouse during the time slots (K+2)-(K+4) and receives a response packet from the mouse during the time slots (K+5)-(K+6). The computer transmits packets only in the even time slots, so the computer is not allowed to transmit a polling packet PPK3 to the keyboard until the time slot (K+8). Similarly, the keyboard cannot response to the computer until time slot (K+11) because the time slots (K+8)-(K+9) are occupied by the polling packet PPK3.

As known above, in the Bluetooth system of the prior art, transmission behavior of the slave devices are totally controlled by the master device, without transmission domination. Therefore, for transmitting the slave data, the master and slave devices have to transmit the packets back and forth, causing more radio resource consumption.

SUMMARY OF THE INVENTION

It is therefore an objective to provide a transmission method and related apparatus to allow a slave device to actively send packet for reducing radio resource overhead.

The present invention discloses a transmission method of reducing radio resource overhead for a slave device of a Bluetooth system, the transmission method comprising the steps of setting an active time slot window on a communication time comprising at least a reception time slot and transforming the reception time slots in the active time slot window into transmission time slots.

The present invention discloses a communication device for reducing radio resource overhead for a slave device of a Bluetooth system, the communication device comprising a central processing unit (CPU) for performing a program code, and a storage device coupled to the central processing unit, for storing the program code. The program code comprises setting an active time slot window on a communication time comprising at least a reception time slot and transforming the reception time slots in the active time slot window into transmission time slots.

The present invention discloses a transmission method of reducing radio resource overhead for a master device of a Bluetooth system, the transmission method comprising the steps of determining an activate time slot window on a communication time comprising at least a transmission time slot, generating a function setup message according to the determined activate time slot window, sending the function setup message to at least a slave device to allow the slave devices to setup the activate time slot window and transforming the transmission time slots into reception time slots during the activate time slot window and receiving Bluetooth packets from the slave devices.

The present invention discloses a communication device for reducing radio resource overhead for a slave device of a Bluetooth system, the communication device comprising a central processing unit (CPU) for performing a program code, and a storage device coupled to the central processing unit, for storing the program code. The program code comprises determining an activate time slot window on a communication time comprising at least a transmission time slot, generating a function setup message according to the determined activate time slot window, sending the function setup message to at least a slave device to allow the slave devices to setup the activate time slot window and transforming the transmission time slots into reception time slots during the activate time slot window and receiving Bluetooth packets from the slave devices These and other objectives of the present invention will no doubt become obvious to those of ordinary skill in the art after reading the following detailed description of the preferred embodiment that is illustrated in the various figures and drawings.

DETAILED DESCRIPTION

Any embodiments of the present invention primarily aim at providing a transmission method and related device that allow a slave device to actively send packets and be independent of a master device. Please note that reception time slots are considered Master-to-Slave time slots, and transmission time slots are considered Slave-to-Master time slots, if no exclusion is made in the embodiment of the present invention.

Figure 2:
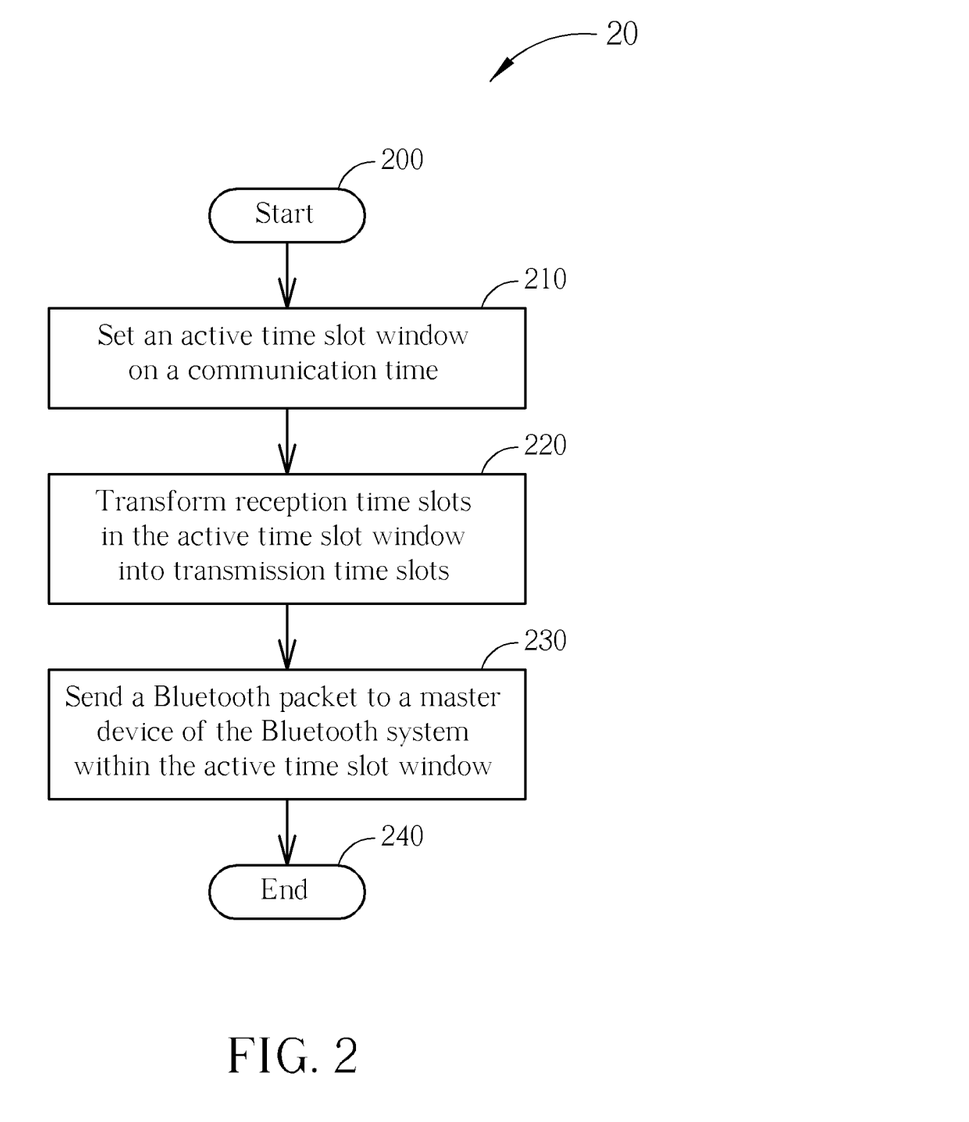
FIG. 2 is a flow chart of a process according to an embodiment of the present invention.

Please refer to FIG. 2, which is a flow chart of a process 20 according to an embodiment of the present invention. The process 20 is used for an activate transmission function in a packet switched domain for a slave device in a Bluetooth system to reduce radio resource consumption. The process 20 includes the following steps:

Step 200: Start.

Step 210: Set an active time slot window on a communication time.

Step 220: Transform reception time slots (Master-to-Slave time slots) in the active time slot window into transmission time slots (Slave-to-Master time slots).

Step 230: Send a Bluetooth packet to a master device of the Bluetooth system within the active time slot window.

Step 240: End.

According to the process 20, the slave device selects one time interval or several time intervals on communication time and set the time interval(s) as the active time slot window. The slave device transforms the all reception time slots in the active time slot window into transmission time slots for sending the Bluetooth packets to the master device within the active time slot window. After the active time slot window is complete, the slave devices perform an implicitly group acknowledged procedure (principle and operation will be stated later on) to confirm that the packets are transmitted successfully or have to be retransmitted. Consequently, within the active time slot window, not only can the radio resource for polling for the master device be saved, but also the communication efficiency between the master device and the slave device can be enhanced.

Figure 3:
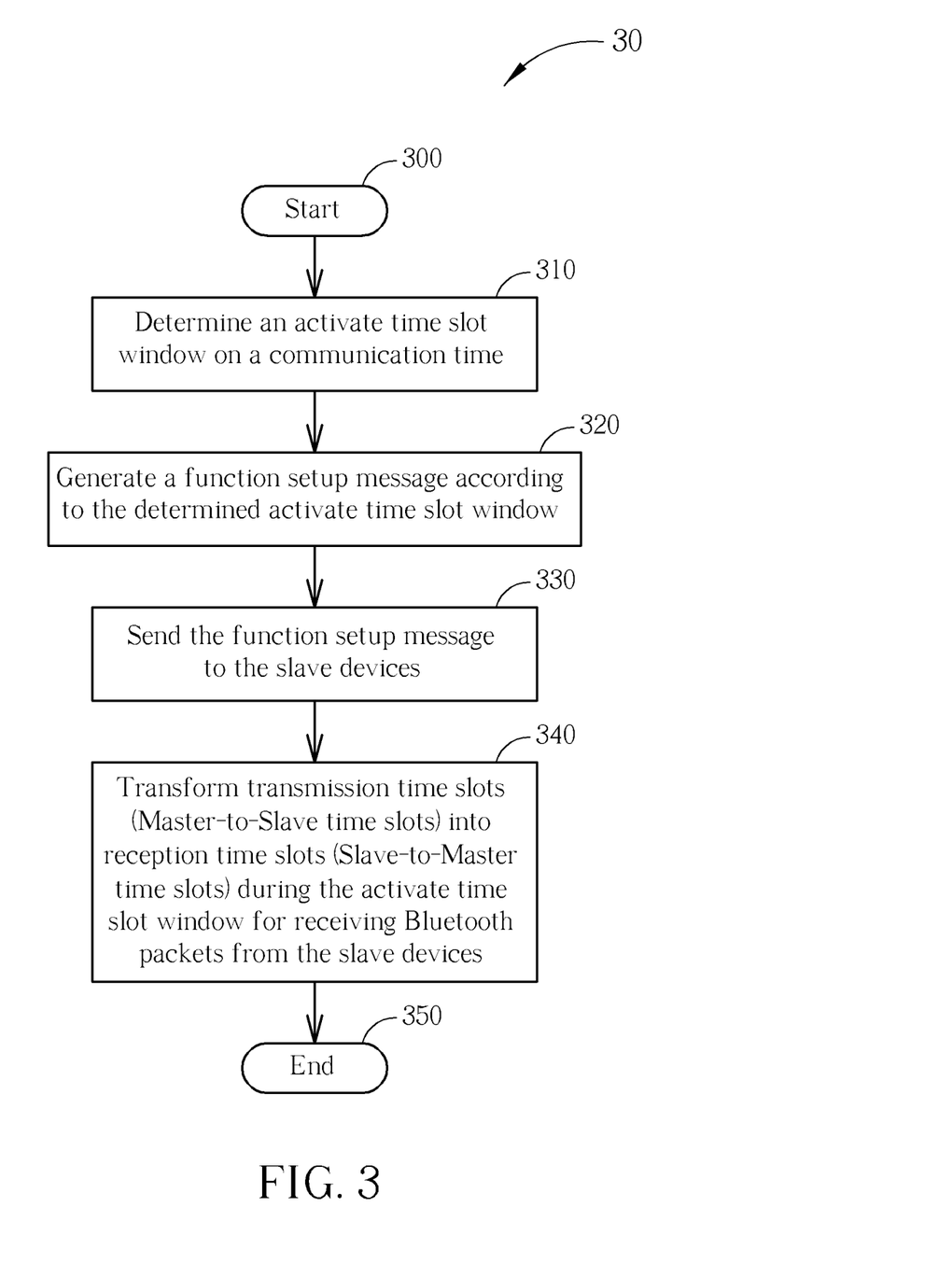
FIG. 3 is a flow chart of a process according to an embodiment of the present invention.

Since the slave devices are not allowed to communicate with each other in the same piconet, the slave device can set the active time slot window according to a function setup message generated by a master device. In this situation, the present invention provides a process in the master device for the active transmission function of the slave device. Please refer to FIG. 3, which is a flow chart of a process 30 according to an embodiment of the present invention. The process 30 can cooperate with the process 20 and includes the following steps:

Step 300: Start.

Step 310: Determine an activate time slot window on a communication time.

Step 320: Generate a function setup message according to the determined activate time slot window.

Step 330: Send the function setup message to the slave devices.

Step 340: Transform transmission time slots (Master-to-Slave time slots) into reception time slots (Slave-to-Master time slots) during the activate time slot window for receiving Bluetooth packets from the slave devices.

Step 350: End.

According to the process 30, the master device selects one time interval or several time intervals on communication time and determines that the selected time interval(s) is the active time slot window. Then, the master device accordingly generates the related function setup message. After that, the function setup message is sent to the slave device to perform the active transmission function setup of the slave device. During the active time slot window, the all of the transmission time slots (Master-to-Slave time slots) of the master device are transformed into the reception time slots (Slave-to-Master time slots) for receiving the Bluetooth packets from the slave device. For the active transmission function setup of the slave device, the master device can know an amount of the slave devices involved with the active transmission function and determine an initial transmission order among the slave devices within the active window time slot. After the active window time slot is complete, the master device performs the implicitly group acknowledged procedure according to the received packet.

Figure 4:
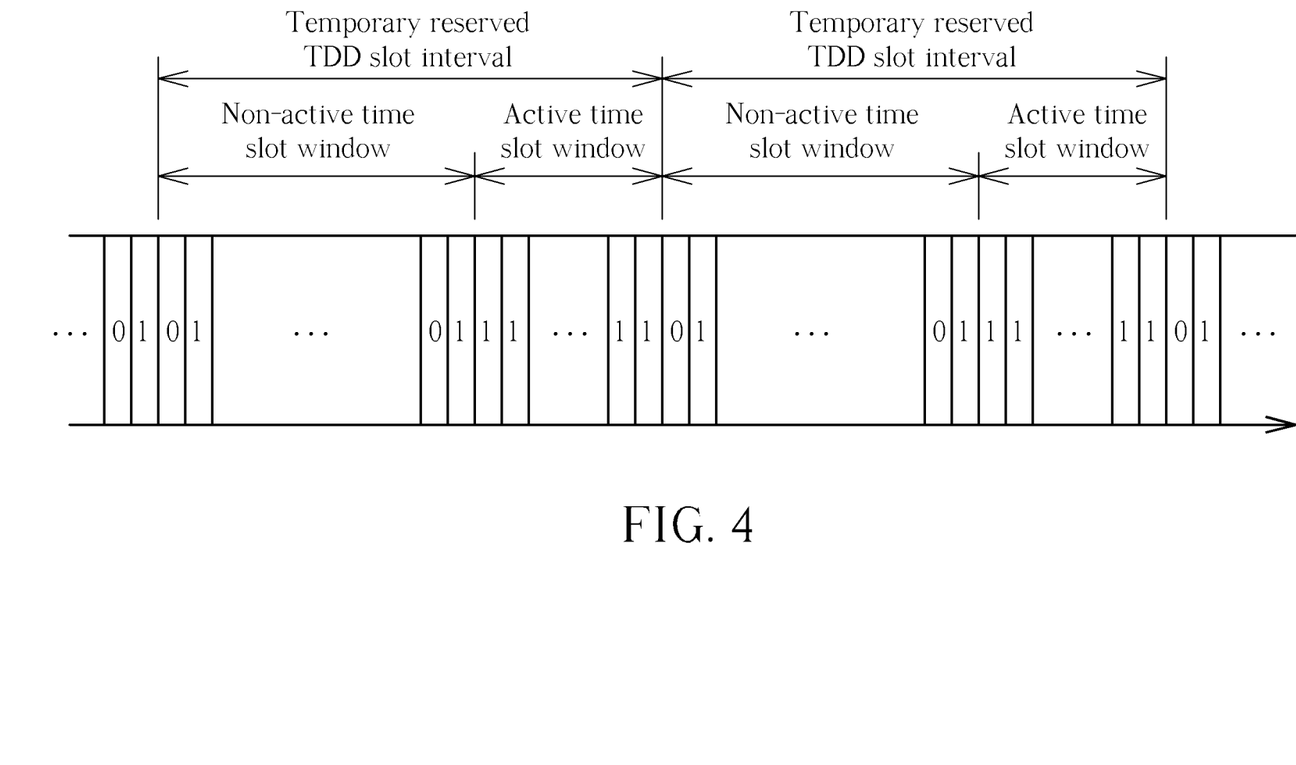
FIG. 4 illustrates communication time deployment of an active transmission function according to an embodiment of the present invention.

Regarding setting the active time slot window, the master device first sets a periodic temporary reserved time division duplex (TDD) slot interval. Then, an active time slot window with fixed time duration is set in the temporary reserved TDD slot interval. The slave device is also set according to the function setup message. Please refer to FIG. 4, which illustrates communication time deployment of an active transmission function according to an embodiment of the present invention. There are two types of time slots on the communication time. The "Master-to-Slave" time slots are denoted as "0". The "Slave-to-Master" time slots are denoted as "1". For the slave devices, the time slots "0" are the reception time slots, and the time slots "1" are the transmission time slots. FIG. 4 roughly illustrates two consecutive temporary reserved TDD slot intervals. Each temporary reserved TDD slot interval includes a non-active time slot window and an active time slot window. The time slots in the non-active time slot window are deployed according to the typical Bluetooth system. Namely, the "Master-to-Slave" time slots and the "Slave-to-Master" time slots are cross-arranged. In the non-active time slot window, the slave devices can send packets only by polling operation of the master device. However, within the active time slot window, all of the "Master-to-Slave" time slots are transformed into the "Slave-to-Master" time slots. The slave devices use one or multiple time slots "1" of the active time slot window to send the Bluetooth packets to the master device according to configuration of the function setup message.

Figure 5:
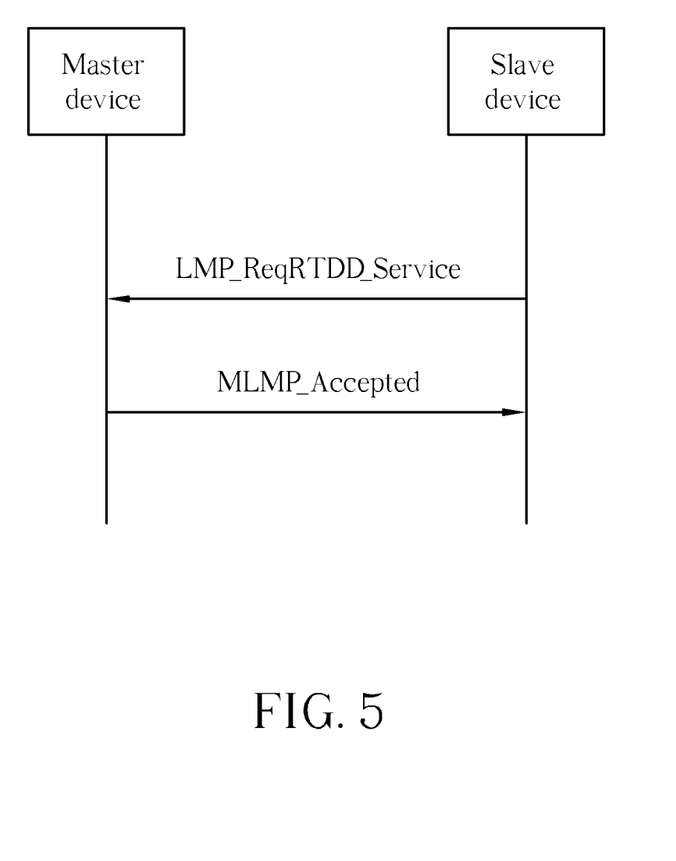
FIGS. 5-7 are timing diagrams of message swap for activating an active transmission function.
Figure 6:
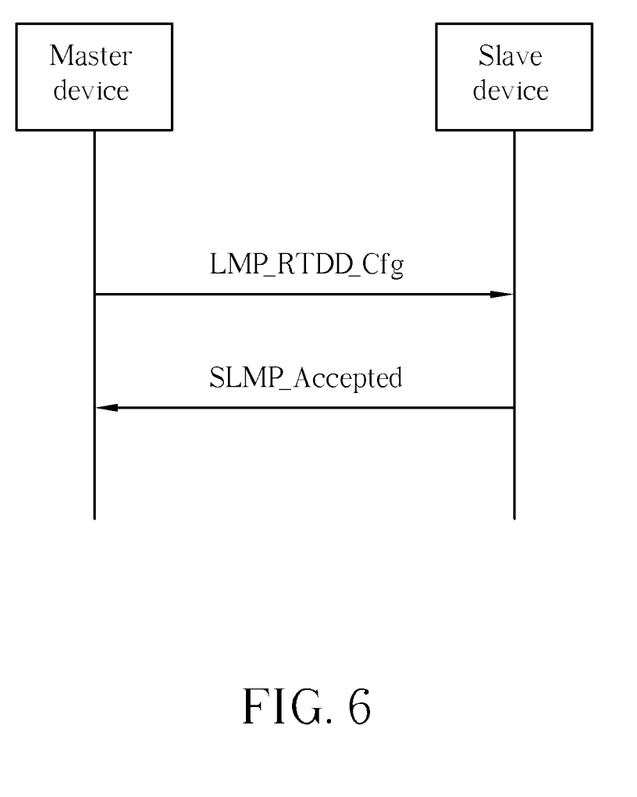
Figure 7:
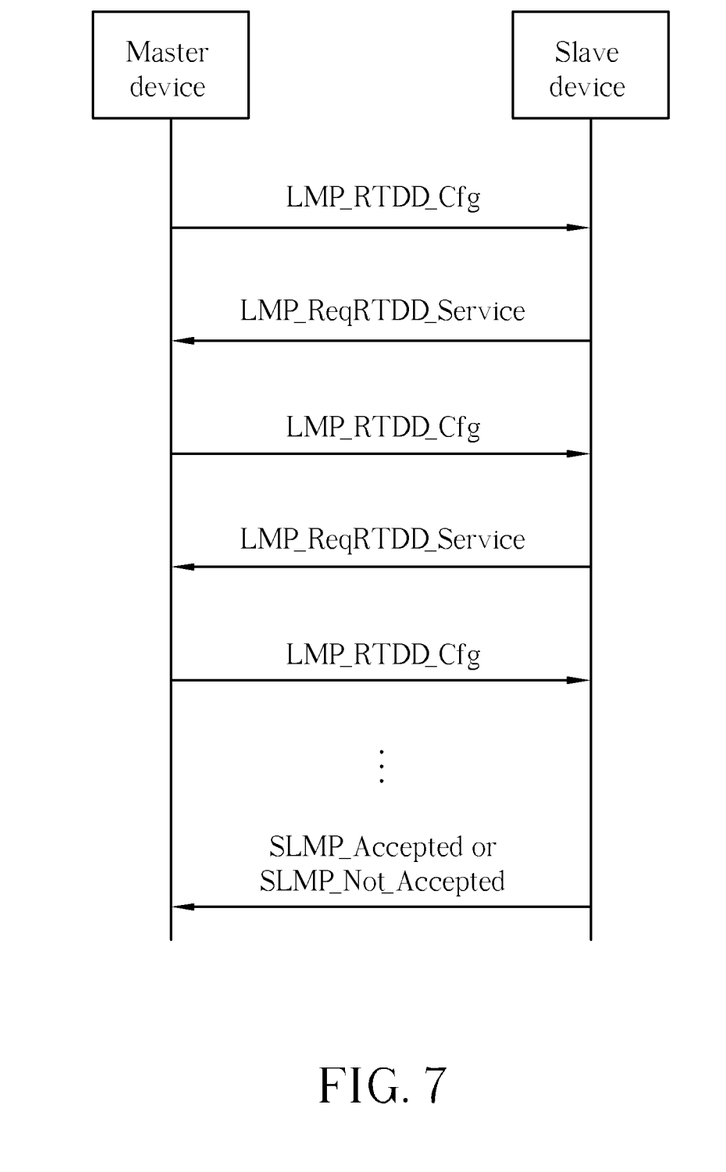

The function setup message includes related parameters of the active transmission function. The parameters are usually generated by the master device and sent to the slave device by unicast method. Please refer to FIGS. 5-7, which are timing diagrams of message exchanges for activating an active transmission function. In FIG. 5, the slave device actively sends a request message LMP_ReqRTDD_Service to request the master device for activation of the active transmission function. When the master device accepts the request from the slave device, the master device responds with a function setup message MLMP_Accepted. The slave device activates the active transmission function (for example, setting the active time slot window) according to the function setup message MLMP_Accepted. In FIG. 6, the master device sends a function setup message LMP_RTDD_Cfg to request the slave device for activation of the active transmission function. The slave device responds to the master device with an accept message SLMP_Accepted to confirm that the request is accepted. In FIG. 7, the slave device and the master device negotiate parameter content of the active transmission function via the function setup message LMP_RTDD_Cfg and the request message LMP_ReqRTDD_Service, respectively. When the slave device does not agree with the parameter content indicated by the master device, the slave device can reply with the request message LMP_ReqRTDD_Service which accompanies slave-reference parameter content. When the master device does not agree with the reference parameter content, the master device, again, sends the function setup message LMP_RTDD_Cfg with new master-reference parameter content. A negotiation procedure will not end until the slave device replies with the accept message SLMP_Accepted. This means the master device and the slave device both reach an agreement. After this, the slave device adapts the last parameter content indicated by the master device. On the contrary, if the slave device replies with a rejection message SLMP_Not_Accepted, this means that the slave device and the master device fail to reach an agreement, and thus the negotiation procedure is suspended.

The request message LMP_ReqRTDD_Service can include parameters Max_Desired_RTDD_Time and Min_Desired_RTDD_Time each represented by two bits indicating time lengths by time slot. Based on the system requirements, the aforementioned parameters can provide acceptable maximum and minimum values of the temporary reserved TDD slot interval, respectively, to the master device or can provide acceptable maximum and minimum values of the active time slot window, respectively. The function setup messages MLMP_Accepted and LMP_RTDD_Cfg can include the parameters, such as RTDD_Interval, RTDD_Window, RTDD_Instant and RTDD_TokenAddr. The parameters RTDD_Interval and RTDD_Window can be represented by two bits (unit in slots) and used for indicating sizes of the temporary reserved TDD slot interval and the active time slot window respectively. The parameter RTDD_Instant is composed of four bits and used for indicating a Bluetooth clock where the master device activates the next active transmission function. In this situation, the slave device can know when the active time slot window is complete. The parameter RTDD_TokenAddr has a length of one bit, and is used for indicating a transmission order among the slave device with the active transmission function in the next active time slot window. In addition, according to the parameter RTDD_TokenAddr, each slave device automatically adjusts the transmission order in each following active time slot window.

Figure 8:
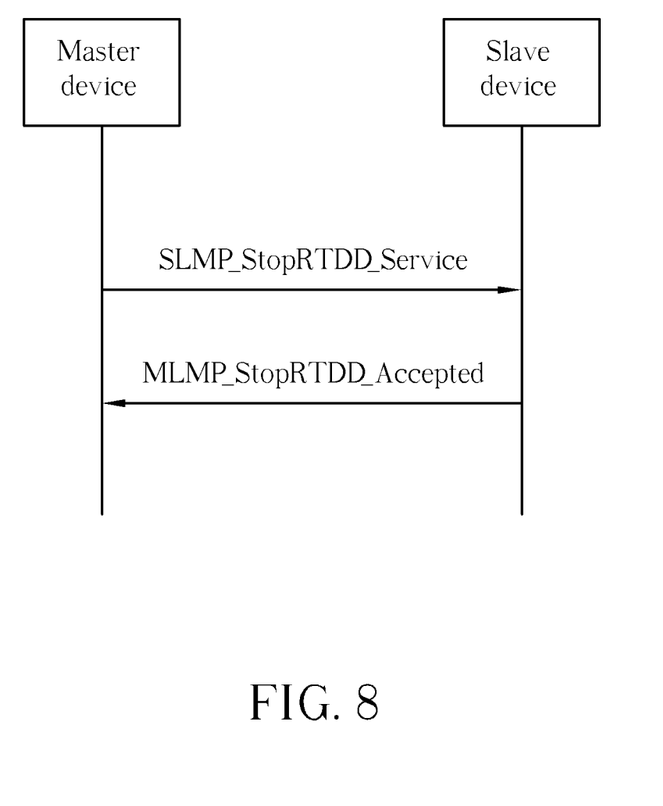
FIGS. 8-9 are timing diagrams of message swap for disabling an active transmission function.
Figure 9:
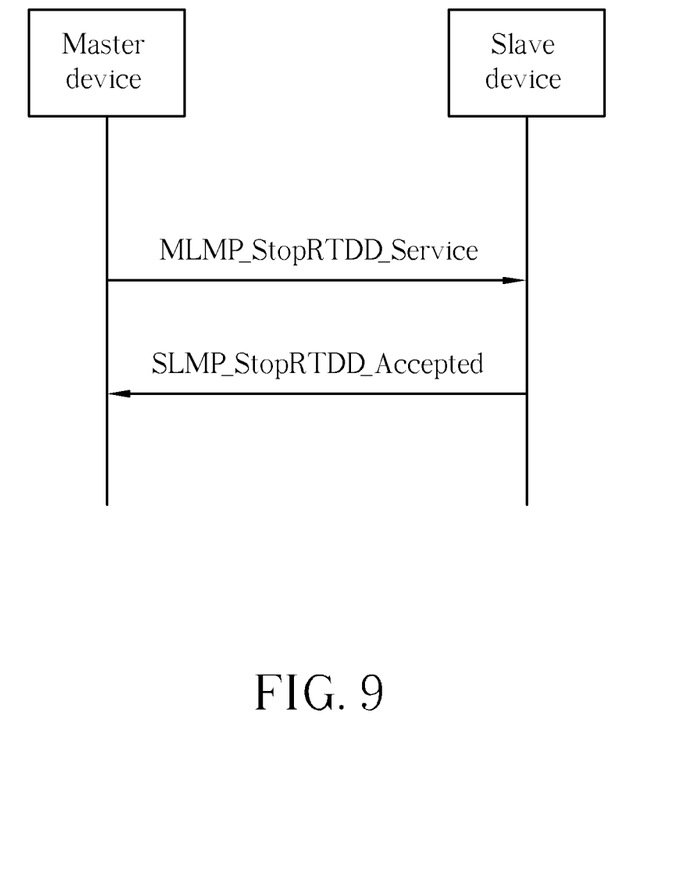

Please refer to FIGS. 8-9, which are timing diagrams of message exchanges for disabling an active transmission function. In FIG. 8, the slave device actively sends a stop request message SLMP_StopRTDD_Service to request the master device for suspending the active transmission function. The master device responds with a stop accept ion message MLMP_StopRTDD_Accepted to inform the slave device that the request is accepted. In FIG. 9, the master device sends a stop request message MLMP_StopRTDD_Service to request the master device for suspending the active transmission function. The slave device responds to the master device with a stop acceptation message SLMP_StopRTDD_Accepted and then stops the active transmission function.

Preferably, the aforementioned messages and related procedure used for activating or disabling the active transmission function, are applied to a link management protocol (LMP) layer in the Bluetooth system, for managing the active transmission function that is implemented in a radio layer.

The active time slot window can be shared by the several slave devices using the active transmission function. When the active transmission function is set, the slave devices first arrange their transmission order. The slave device which has the first transmission packet in the active time slot window is called an initiator. The other slave devices are called followers. Since, in the Bluetooth system, the master device allocates a logical transport address (Lt_Addr) to each slave device, the slave device takes advantage of the logical transport address and the aforementioned parameter RTDD_TokenAddr to establish the transmission order with other slave devices. To put it clearly, transmission timing among single master device and multiple slave devices is stated in the following embodiments.

Figure 10:
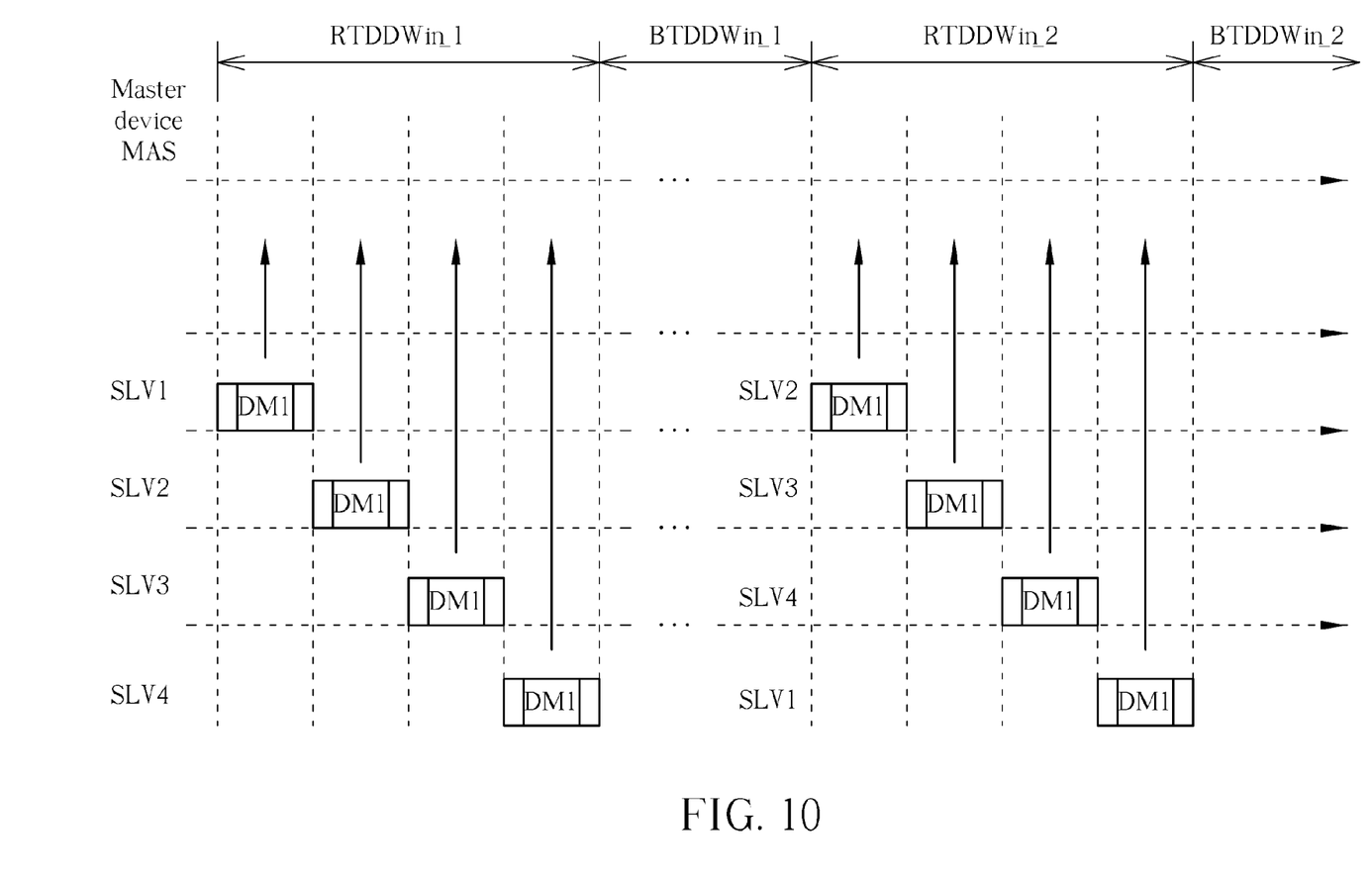
FIG. 10 is a timing diagram of a master device and slave devices according to a first embodiment of the present invention.

Please refer to FIG. 10, which is a timing diagram of a master device MAS and slave devices SLV1-SLV4 according to a first embodiment of the present invention. There are two temporary reserved TDD slot intervals on communication time, shown in FIG. 10. One temporary reserved TDD slot interval includes an active time slot window RTDDWin_1 and an non-active time slot window BTDDWin_1. The other temporary reserved TDD slot interval includes an active time slot window RTDDWin_2 and an non-active time slot window BTDDWin_2. The active time slot windows RTDDWin_1 and RTDDWin_2 both provides four transmission time slots for slave device SLV1-SLV4 to actively sends transmission packets. In the active time slot window RTDDWin_1, the slave device SLV1 is an initiator and sends type DM1 Bluetooth packets to the master device MAS in order, with other slave devices. For the attributes of the human interface device, such as a mouse or a keyboard, it is sufficient for type DM1 or type DH1 Bluetooth packets to meet data capacity requirements. Headers of the type DM1 or type DH1 Bluetooth packets include an access code of sixty-eight bits. Since the type DM1 or type DH1 Bluetooth packets are well known by those in the art, the related format is omitted herein. To balance transmission efficiency among each slave device, the slave devices, in order, cyclically go as the initiator in the following next active time slow windows. As shown in FIG. 10, in the next active time slot window RTDDWin_2, the slave device SLV2 is the initiator, and the slave devices SLV2, SLV3, SLV4 and SLV1 send Bluetooth packets in sequence. In next three active time slot windows (not shown herein), the initiator will be the slave devices SLV3, SLV4 and SLV1, respectively. The slave devices SLV1-SLV4 can automatically adjust transmission order as the above mentioned according to their own logical transport addresses and the parameters RTDD_TokenAddr. In other words, positions of the predetermined transmission time slots of the slave devices SLV1-SLV4 cyclically vary with the period of the temporary reserved TDD slot intervals.

In the non-active time slot window BTDDWin_1 and BTDDWin_2, the master device and the slave devices SLV1-SLV4 individually perform an implicitly group acknowledged procedure corresponding to the active time slot windows RTDDWin_1 and RTDDWin_2. The related principle is described as follows. First, in the first "Master-to-Slave" time slot following the active time slot window, the slave devices SLV1-SLV4 all detect for the first packet sent by the master device MAS. Then, there are three cases described as below:

Case 1: If the first packet sent by the master device MAS includes the logical transport address which does not belong to any of the slave devices SLV1-SLV4 or the first packet is a broadcast packet, this means the packets sent by the slave devices SLV1-SLV4 within the active time slot window are all successfully received by the master device MAS. For example, the slave devices SLV1-SLV4 have logical transport addresses Lt_Addr1-Lt_Addr4, respectively. If the first packet has a logical transport address Lt_Addr5, it represents that the packets sent by the slave devices SLV1-SLV4 are successfully received, namely positively acknowledged.

Case 2: If the first packet includes any logical transport address of the slave devices SLV1-SLV4, this means that in the active time slot window, (i) the slave device indicated by the first packet needs to retransmit the packet, namely, negatively acknowledged (NACK); (ii) the packet(s) sent earlier than the slave device indicated by the first packet is (are) successfully transmitted; (iii) any slave device sending the packet later than the indicated slave device has to enter a polling waiting state to wait for notification from the master device until the packets sent by the master device do not have any logical transport address belonging to the slave devices SLV1-SLV4. For example, if the first packet has the logical transport address Lt_Addr3, this means that the packets sent by the slave devices SLV1-SLV2 are transmitted successfully. The slave device SLV3 must retransmit the packet, and the slave device SLV4 enters the polling waiting state.

Case 3: if the slave devices SLV1-SLV4 do not receive any packets from the master device before the next active time slot window begins, it means that all packets sent by the slave devices SLV1-SLV4 are received successfully, that is, called implicitly acknowledged.

Thus, from the standpoint of the slave devices SLV1-SLV4, an appropriate acknowledged procedure must includes at least the following steps and principles, with taking the slave device SLV2 as an example:

(1) Enter a state of listening the Bluetooth packet from the master device MAS after the active time slot window is complete.

(2) Determine that the sent Bluetooth packet is positively acknowledged, when the slave device does not received any packet from the master device within the non-active time slow window.

(3) Determine that the sent Bluetooth packet is positively acknowledged when succeeding in receiving the first Bluetooth packet from the master device MAS and the first Bluetooth packet has a logical transport address exceeding the logical transport address Lt_Addr2.

(4) Determine that the sent Bluetooth packet is positively acknowledged when succeeding in receiving the first Bluetooth packet and the first Bluetooth packet is a broadcast packet.

(5) Determine that the sent Bluetooth packet needs to be retransmitted when succeeding in receiving the first Bluetooth packet which has the logical transport address Lt_Addr2 as well.

(6) Enter a polling waiting state when succeeding in receiving the first Bluetooth packet which has the logical transport address within a range of the logical transport address Lt_Addr2.

(7) Follow the rules (3), (5) and (6) when the slave device receives a Bluetooth packet from the master device in the polling waiting state.

"the logical transport address exceeding the logical transport address Lt_Addr2" in the aforementioned (3) means corresponding slave device whose transmission order is behind the slave device SLV2, or which does not belong to any of slave devices SLV1-SLV4. On the contrary, "the logical transport address within a range of the logical transport address Lt_Addr2" means that the transmission order is front of the slave device SLV2.

Figure 11:
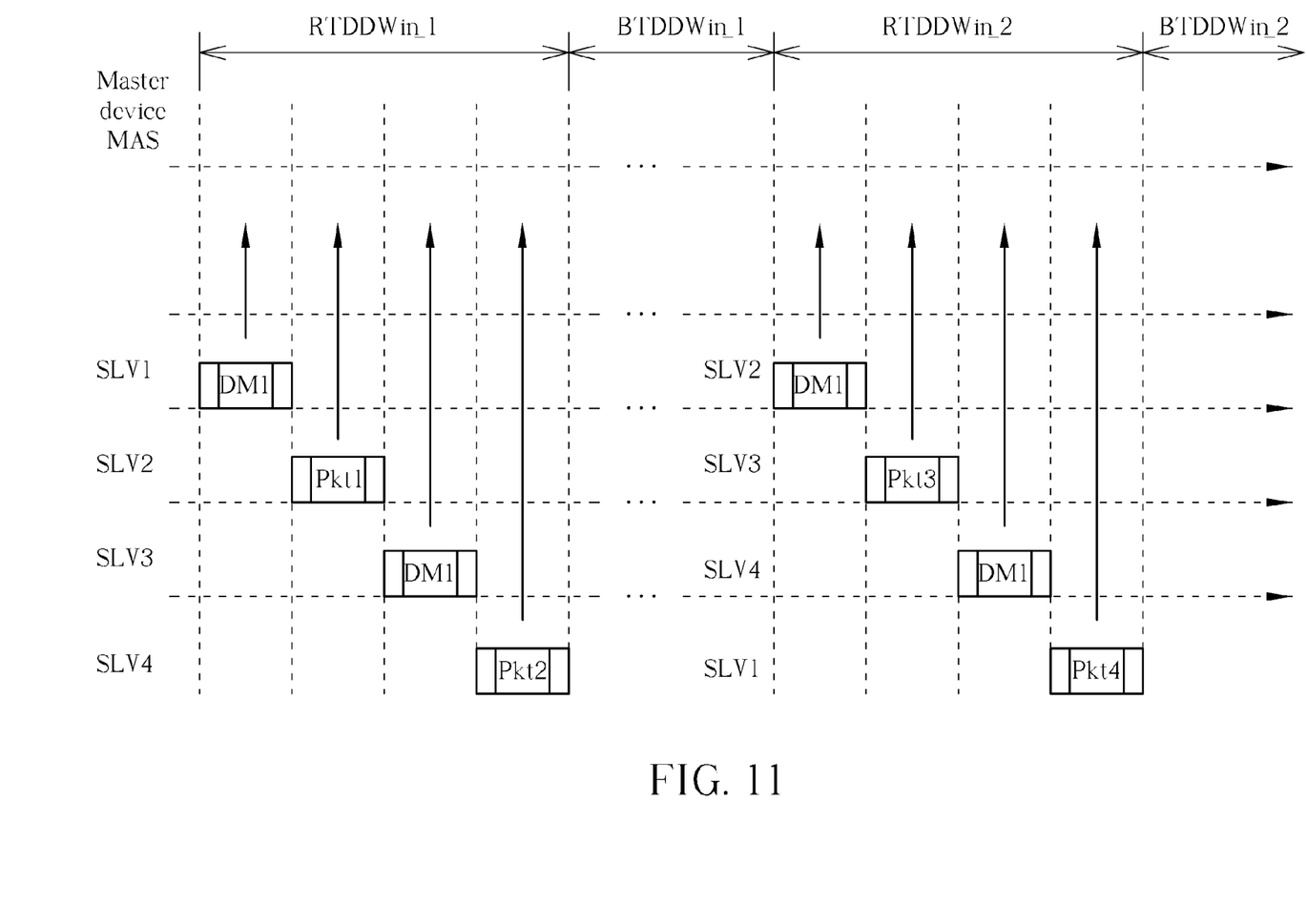
FIG. 11 is a timing diagram of a master device and slave devices according to a second embodiment of the present invention.

Besides, please refer to FIG. 11, which is a timing diagram of a master device MAS and slave devices SLV1-SLV4 according to a second embodiment of the present invention.

In FIG. 11, the first and the third time slots of the active time slot windows RTDDWin_1 and RTDDWin_2 are transformed from the "Master-to-Slave" time slots into "Slave-to-Master" time slots. The second and the forth time slots are still "Slave-to-Master" time slots. The difference between FIG. 11 and FIG. 10 is that the slave device in the second order and the slave device in the forth order use shorter access codes (e.g. 32 bits) to transmit the packets (i.e. Pkt1-Pkt4 shown in FIG. 11). In the second time slots and the forth time slots, the typical slave devices are operated in a transmission state and does not receive any packets, so the present invention slave devices do not interfere the operation of the typical slave devices although sending the packets with short access codes. Consequently, the present invention slave devices reduce transmission power consumption and can keep the same compatibility with the typical slave device.

Please note that, the use of the logical transport address can be seen as one embodiment of the present invention for the determination of the transmission order. Those skilled in the art can use any information which establishes relative relationship among the slave devices as an ordering indicator. In addition, the slave device of the present invention can perform transmission in multiple time slots of the active time slot window and is not limited to perform transmission in only one time slot.

Figure 12:
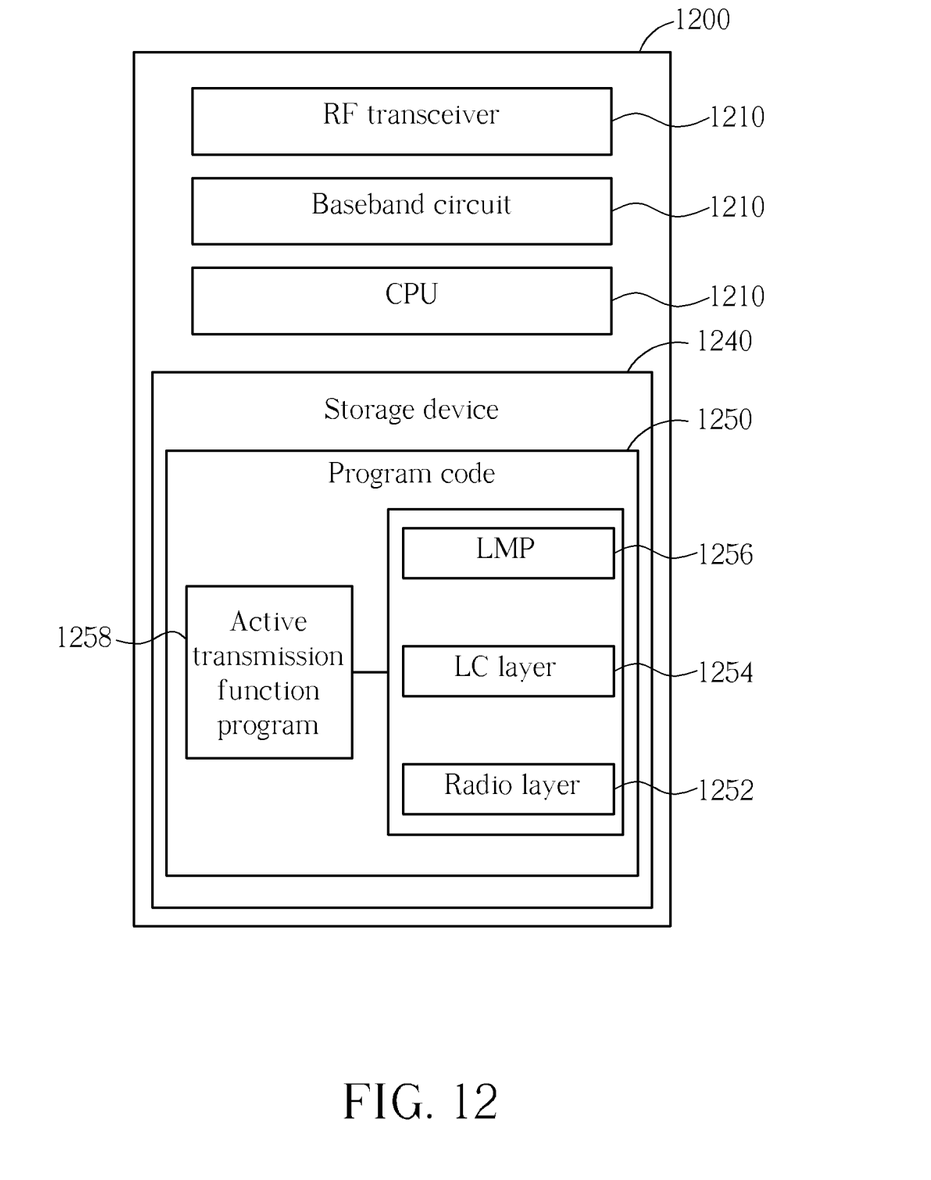
FIG. 12 is a schematic diagram of a communication device in a Bluetooth device according to an embodiment of the present invention.

Please refer to FIG. 12, which is a schematic diagram of a communication device 1200 in a Bluetooth device according to an embodiment of the present invention. The communication device 1200 includes a radio frequency (RF) transceiver 1210, a baseband circuit 1220, a central processing unit (CPU) 1230 and a storage device 1240. The RF transceiver 1210 allows the Bluetooth device to transmit and receive wireless signals. The CPU 1230 can execute a program code 1250 stored in the storage device 1240 for control of the RF transceiver 1210, the baseband circuit 1220 and the storage device 1240. The program code 1250 includes a radio layer 1252, a link control (LC) layer 1254 and a link management protocol (LMP) 1256. The embodiment of present invention provides an active transmission function program 1258 in the program code 1250 which is executed by the CPU 1230 to carry out the operation of the active transmission function on the master device or the slave device.

When the communication device 1200 is applied to a Bluetooth slave device, the active transmission function program 1258 is mainly used for implementing the process 20 and allowing the slave device actively to send packets to the master device within the active time slot window. In this situation, the radio layer 1252 cooperates with the RF transceiver 1210 to perform frequency synthesis and data transformation, thereby transmitting and receiving the packets on physical channels. The link control layer 1254 cooperates with the baseband circuit 1220 to identify whether the time slots are the transmission time slots or the reception time slots and to set the active time slot window according to the function setup message. The link management protocol layer 1256 is used for decoding and setting related information of the active transmission function, for example, decoding the function setup message from the master device, and also used for managing the related parameters of the active transmission function, such as the aforementioned parameters Max_Desired_RTDD_Time and RTDD_Instant. By managing the parameters, the link management protocol layer 956 is responsible for establishment, management, and release of the connection with the master device. Since the communication device 1200 can use the active transmission function program 1258 to implement the process 20, the detailed operations of the active transmission function can be found above (as illustrated in FIG. 2 and FIGS. 4-11).

When the communication device 1200 is applied to a Bluetooth master device, the active transmission function program 1258 is mainly used for implementing the process 30. In this situation, the link control protocol layer 1254 cooperates with the baseband circuit 1220 to identify whether the time slots are the transmission time slots or the reception time slots, and to set the active time slot window. The link management protocol layer 1256 is used for generating activation information and disabled information of the active transmission function to request the slave device for activating or disabling the active transmission function. Since the communication device 1200 uses the active transmission function program 1258 for implementing the process 30, the detailed operation of the active transmission function can be found above (as illustrated in FIG. 3 and FIGS. 4-11).

To sum up, the above embodiments establish the active time slot window on communication time of the slave device and the master device in the Bluetooth system. This makes the packet transmission of the slave device not restricted by the transmission behavior of the master device. In this situation the master device can reduce the amount of polling packets. Compared with the prior art, about fifty percent of radio resource can be saved. In addition, the slave device uses the short access code and remains still compatible with the typical slave device So that the radio resource consumption can be further reduced.

Those skilled in the art will readily observe that numerous modifications and alterations of the device and method may be made while retaining the teachings of the invention.

What is claimed is:

1. A transmission method of reducing radio resource overhead for a slave device of a Bluetooth system, the transmission method comprising the steps of:
   receiving a function setup message generated by a master device of the Bluetooth system from the master device, and activating an active transmission function according to the function setup message;
   setting an active time slot window on a communication time comprising at least a reception time slot; and
   transforming the reception time slots in the active time slot window into transmission time slots;
   wherein the master device sets a corresponding active time slot window according to the function setup message, and transforms all corresponding transmission time slots in the corresponding active time slot window into corresponding reception time slots, to receive a Bluetooth packet from the slave device.

2. The transmission method of claim 1, wherein the step of setting the active time slot window on the communication time comprises setting the active time slot window on the communication time according to the function setup message generated by the master device of the Bluetooth system.

3. The transmission method of claim 1 further comprising the step of sending the Bluetooth packet to the master device of the Bluetooth system within the active time slot window.

4. The transmission method of claim 3 further comprising the step of performing an implicitly group acknowledged procedure after the active time slot window is complete.

5. The transmission method of claim 4, wherein the step of performing the implicitly group acknowledged procedure after the active time slot window is complete comprises using an ordering indicator, which is used for distinguishing the slave device from other slave devices, to perform the implicitly group acknowledged procedure, the implicitly group acknowledged procedure comprising:

entering a state of receiving the Bluetooth packet from the master device after the active time slot window is complete;
determining that the sent Bluetooth packet is positively acknowledged, when the slave device has not received any packet from the master device within a predetermined time;
determining that the sent Bluetooth packet is positively acknowledged when the slave device succeeds in receiving the first Bluetooth packet from the master and the first Bluetooth packet comprises an ordering indicator exceeding the ordering indicator;
determining that the sent Bluetooth packet is positively acknowledged when the slave device succeeds in receiving the first Bluetooth packet and the first Bluetooth packet is a broadcast packet;
determining that the sent Bluetooth packet needs to be retransmitted when the slave device succeeds in receiving the first Bluetooth packet and the first Bluetooth packet comprises an ordering indicator equal to the ordering indicator;
entering a polling waiting state when the slave device succeeds in receiving the first Bluetooth packet and the first Bluetooth packet comprises an ordering indicator within a range represented by the ordering indicator; and
determining that the sent Bluetooth packet is positively acknowledged when the slave device receives a Bluetooth packet from the master device in the polling waiting state and the Bluetooth packet comprises an ordering indicator exceeding the ordering indicator.

6. The transmission method of claim 5, wherein the ordering indicator is a logical transport address.

7. The transmission method of claim 3 further comprising the step of setting a periodic temporary reserved time division duplex slot interval which comprises the activate time slot window.

8. The transmission method of claim 7, wherein the step of sending the Bluetooth packet to the master device of the Bluetooth system within the active time slot window comprises:
   sending the Bluetooth packet to the master device of the Bluetooth system in a predetermined transmission time slot of the activate time slot window, wherein a position of the predetermined transmission time slot in the activate time slot window periodically varies with a period of the temporary reserved time division duplex slot interval.

9. The transmission method of claim 3, wherein the Bluetooth packet comprises an access code with length less than 68 bits.

10. A communication device for reducing radio resource overhead for a slave device of a Bluetooth system, the communication device comprising:
    a central processing unit (CPU) for performing a program code;
    a storage device coupled to the central processing unit, for storing the program code;
    wherein the program code comprises:
        receiving a function setup message generated by a master device of the Bluetooth system from the master device, and activating an active transmission function according to the function setup message;
        setting an active time slot window on a communication time comprising at least a reception time slot; and
        transforming the reception time slots in the active time slot window into transmission time slots;

wherein the master device sets a corresponding active time slot window according to the function setup message, and transforms corresponding transmission time slots in the corresponding active time slot window into corresponding reception time slots, to receive a Bluetooth packet from the slave device.

11. The communication device of claim 10, wherein the program code further comprises the step of setting the active time slot window on the communication time according to the function generated by the master device of the Bluetooth system.

12. The communication device of claim 10, wherein the program code further comprises the step of sending the Bluetooth packet to a master device of the Bluetooth system within the active time slot window.

13. The communication device of claim 12, wherein the program code further comprises the step of performing an implicitly group acknowledged procedure after the active time slot window is complete.

14. The communication device of claim 13, wherein the step of performing the implicitly group acknowledged procedure after the active time slot window is complete comprises using an ordering indicator, which is used for distinguishing the slave device from other slave devices, to perform the implicitly group acknowledged procedure, the implicitly group acknowledged procedure comprising:
   entering a state of receiving the Bluetooth packet from the master device after the active time slot window is complete;
   determining that the sent Bluetooth packet is positively acknowledged, when the slave device has not received any packet from the master device within a predetermined time;
   determining that the sent Bluetooth packet is positively acknowledged when the slave device succeeds in receiving the first Bluetooth packet from the master and the first Bluetooth packet comprises an ordering indicator exceeding the ordering indicator;
   determining that the sent Bluetooth packet is positively acknowledged when the slave device succeeds in receiving the first Bluetooth packet and the first Bluetooth packet is a broadcast packet;
   determining that the sent Bluetooth packet needs to be retransmitted when the slave device succeeds in receiving the first Bluetooth packet and the first Bluetooth packet comprises an ordering indicator equal to the ordering indicator;
   entering a polling waiting state when the slave device succeeds in receiving the first Bluetooth packet and the first Bluetooth packet comprises an ordering indicator within a range represented by the ordering indicator; and
   determining that the sent Bluetooth packet is positively acknowledged when the slave device receives a Bluetooth packet from the master device in the polling waiting state and the Bluetooth packet comprises an ordering indicator exceeding the ordering indicator.

15. The communication device of claim 14, wherein the ordering indicator is a logical transport address.

16. The communication device of claim 10, wherein the program code further comprises the step of setting a periodic temporary reserved time division duplex slot interval which comprises the activate time slot window.

17. The communication device of claim 16, wherein the step of sending the Bluetooth packet to the master device of the Bluetooth system within the active time slot window comprises:
   sending the Bluetooth packet to the master device of the Bluetooth system in a predetermined transmission time slot of the activate time slot window, wherein a position of the predetermined transmission time slot in the activate time slot window periodically varies with a period of the temporary reserved time division duplex slot interval.

18. The communication device of claim 12, wherein the Bluetooth packet comprises an access code with length less than 68 bits.

* * * * *